A. D. Crane,
Horse Power.
Nº 9,049.  Patented June 22, 1852.
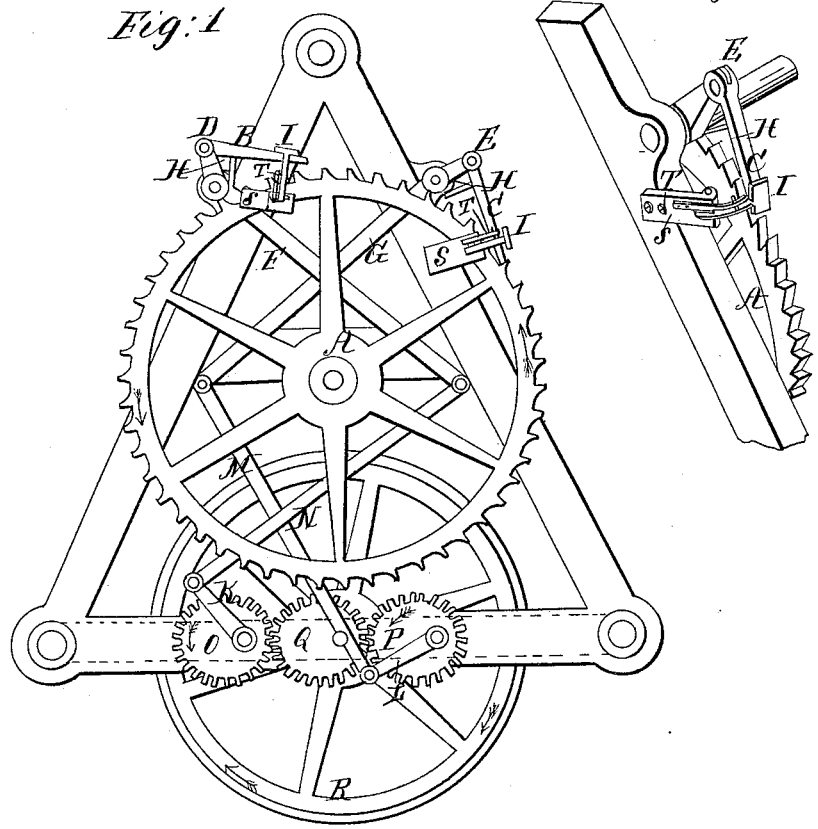

UNITED STATES PATENT OFFICE.

A. D. CRANE, OF NEWARK, NEW JERSEY.

HORSE-POWER.

Specification of Letters Patent No. 9,049, dated June 22, 1852.

*To all whom it may concern:*

Be it known that I, AARON D. CRANE, of the city of Newark, in the county of Essex and State of New Jersey, have invented a new and useful Machine for a Horse-Power, which is described as follows, reference being had to the annexed drawing of the same, making a part of this specification.

The drawing is a plan and gives a view of the machine in a horizontal position as intended to be used, excepting the upper plate which is the shape of the lower plate and attached to it by three pillars one at each angle; and also excepting the sectional bar or plate about half way between the upper and lower plates, and over and receiving the upper end of the shafts of the eccentric wheels, being shown by dotted lines between the pillars, on that section of the lower plate in which the lower ends of the shafts of the eccentric wheels run.

On the upper end of the center shaft of the main wheel A is intended to be fastened a sweep for the horse to be attached to for driving it as in other sweep machines; the horse walking around the machine attached to the sweep causes the main wheel A to revolve. This wheel has fifty teeth, each tooth of which acts against the end of the pallets B and C alternately; these pallets work on joints D and E in the levers F and G, and are lifted out of the teeth of the main wheel by a pin H in each of them coming in contact with with the shaft of the levers F and G at each return of the pallets; and are carried in again by the guides I I Figures 1 and 2 which guides are jointed to the pieces S S, fastened to the top plate as in Fig. 2 and are kept in position by the springs T T Figs. 1 and 2. These guides might be made permanent without joint or spring and the performance of the machine in its forward motion be the same but on the motion being reversed by the backing of the horse or otherwise the teeth of the main wheel could not pass the guides; therefore the necessity of having them hinged and kept in position by a spring so that the guides may give back to each tooth upon a reversal of the motion of the main wheel. The levers F and G are placed below the main wheel and work on their shafts as a fulcrum, and are connected with the cranks K and L by the rods M and N, these connecting rods working in a joint on the levers F and G and the cranks K and L; these cranks are fastened to the upper end of the shafts of the eccentric wheels O and P, and by the action of the main wheel upon the pallets the power is transmitted through the levers and rods to the cranks causing the eccentric wheels O and P to revolve; these eccentric wheels O and P run into and drive the eccentric wheel Q; below the lower plate is fastened the driving pulley R on which pulley a belt is intended to be used for the purpose of driving other machinery.

The eccentric wheels are all of the same size and number of teeth, and the eccentricity of them is about one fifth of their longest diameter, the motions of the eccentric wheel Q is equal and uniform but that of the other two O and P is faster alternately in one part of their revolution than in the other, such an unequal motion being required for two purposes one of relieving the pallets, and obtaining a steady and uniform motion of the main wheel and the other for obtaining a direct motion of the driving pulley R not liable to be reversed as it would be by using common wheels.

The advantages of this arrangement are: 1st. That for a horse power it is more compact and portable than others—a greater speed is obtained at a less expense from the fact that each tooth of the main wheel gives one revolution of the driving pulley, thereby requiring a less number of wheels to produce the same speed and consequently less friction. 2nd. That this arrangement is also applicable for all other purposes, when an increase of speed is required for driving machinery.

What I claim and desire to secure by Letters Patent is—

1. The method of combining and arranging the two pallets as connected by a joint with the levers, in such a manner that by the action of the teeth of the main wheel against the end of these pallets, an oscillating motion is given to the levers; and by such motion and the aid of the connecting rods and cranks, a rotary motion is produced, but I do not claim the application of connecting rods and cranks for producing such rotary motion.

2. I do also claim the method of combining and arranging with the parts above claimed the three eccentric wheels running together in such a manner that while the motion of the middle one is uniform that of the other two, on which the cranks act are irregular alternately; that irregularity being required for the purpose of giving to the middle eccentric wheel a direct motion not subject to being reversed as it would be by using common wheels, all as herein before described for the purposes set forth.

3. I do not intend by the foregoing claim to limit myself in the application of this invention to horse powers, but to apply it as I may think proper to other purposes for driving machinery when speed is required.

AARON D. CRANE.

Signed in the presence of—
 Moses G. Crane,
 Augustus S. Crane.